United States Patent [19]

Varga

[11] Patent Number: 4,771,361
[45] Date of Patent: Sep. 13, 1988

[54] ELECTRODE ARRANGEMENT FOR CORONA DISCHARGES

[75] Inventor: Andras Varga, Eppelheim, Fed. Rep. of Germany

[73] Assignee: Dr. Engelter & Nitsch, Wirtschaftsberatung, Frankfurt am Main, Fed. Rep. of Germany

[21] Appl. No.: 906,321

[22] Filed: Sep. 11, 1986

[30] Foreign Application Priority Data

Sep. 16, 1985 [DE] Fed. Rep. of Germany ....... 3532978

[51] Int. Cl.$^4$ ............................................... H05F 3/06
[52] U.S. Cl. ..................................... 361/231; 55/137; 55/152
[58] Field of Search ............... 361/220, 225, 226, 230, 361/231, 232; 55/137, 150, 152; 250/324, 325, 326

[56] References Cited

U.S. PATENT DOCUMENTS 4,230,466 10/1980 Michel ........................... 361/230 X
4,502,093 2/1985 Saurehman ..................... 361/232 X

FOREIGN PATENT DOCUMENTS 233729 4/1910 Fed. Rep. of Germany ........ 55/150
344705 11/1921 Fed. Rep. of Germany ........ 55/150
2341626 9/1974 Fed. Rep. of Germany .

Primary Examiner—Michael L. Gellner
Assistant Examiner—Brian W. Brown
Attorney, Agent, or Firm—Toren, McGeady & Associates

[57] ABSTRACT

In an electrode arrangement for corona discharges, preferably for use in apparatus for purification of air and other gases and/or air conditioning, an electrode connected to one pole of a high voltage DC source is provided from which project corona discharge electrodes. The other pole of the DC source is connected to a field electrode, which is arranged within the region affected by the corona discharge electrode. With this electrode arrangement, not only particles but also aerosols and gases can be separated out.

27 Claims, 3 Drawing Sheets

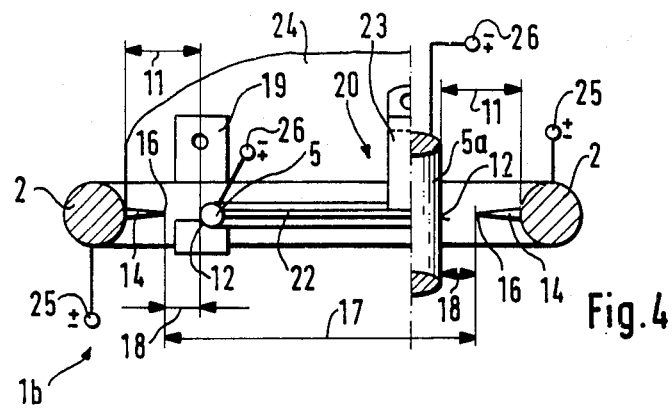
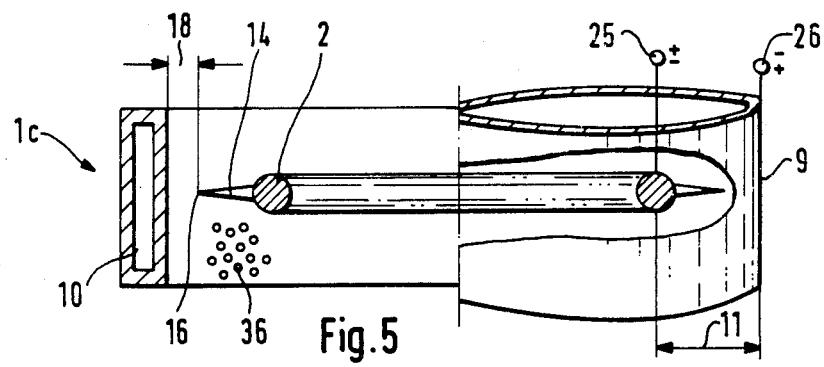
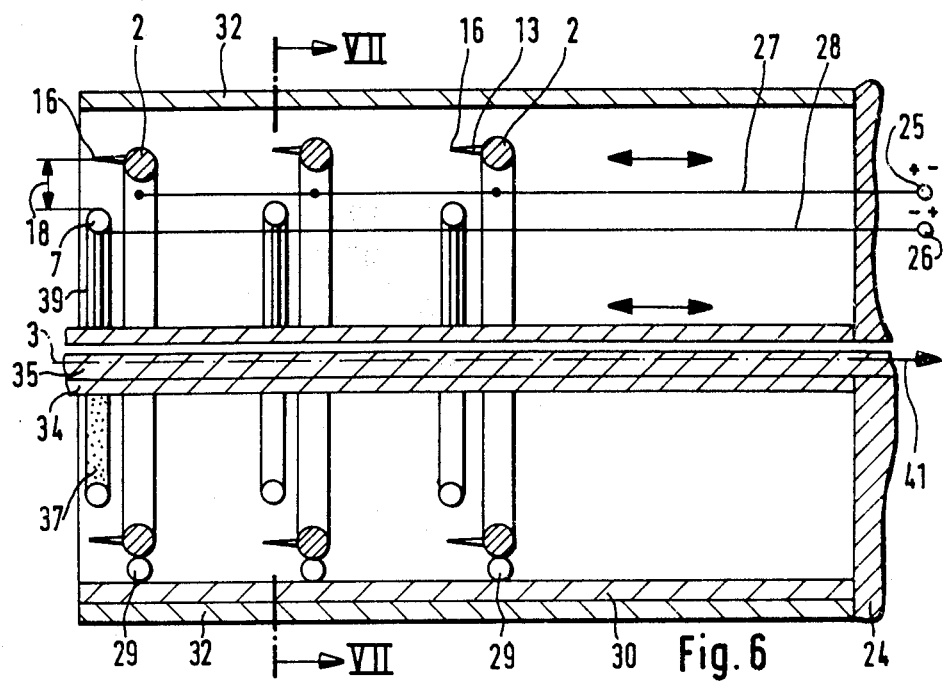

ELECTRODE ARRANGEMENT FOR CORONA DISCHARGES

BACKGROUND OF THE INVENTION

1. Field of the Invention

The invention is directed to an electrode arrangement for corona discharges, preferably for use in apparatus for the purification of air and other gases and/or for air conditioning.

2. Description of Related Art

Electrostatic filters have been known for several decades for purification of industrial commercial and waste gases. The main users of such electrostatic filters are, above all, power stations and refuse incinerators, the cement industry, iron- and steel works, the chemical industry and the non-ferrous metallurgy, as well as the cellulose industry.

In the course of time, accurate knowledge of industrial production processes has made possible the systematic investigation of all parameters affecting the operation of electrostatic filters.

Dust particles suspended in gas are electrically charged by the electrostatic filter and are conveyed, under the influence of a strong electrical field, to precipitation electrodes where they are deposited. The precipitation electrodes are grounded in common with the filter housing, while corona electrodes (thin wires or bands provided with five points) have a negative polarity and are supported by insulators.

A DC voltage exists between the electrodes which, depending upon filter construction and use, amounts to 20 kV up to over 100 kV. In the direct environment of the corona electrodes, corona discharges occur because of the high field strength. In the course of this, electrons are liberated and the correspondingly negatively charged gas ions which are generated are deposited on the dust particles. These charged particles migrate to the precipitation electrode under the influence of the electrical field, where they give off the charge ("purification of industrial commercial- and waste gases", Lurgi Environmental and Chemical Technology GMbH, Frankfurt am Main).

Although electrostatic filters have been known for more than six decades for purification of industrial commercial and waste gases, the utilization of corona discharges in apparatus for purification of air and other gases and/or for air conditioning is still relatively new.

An electrostatic filter for purifying breathing air in closed spaces of suspended material of all sorts, such as organic and inorganic dust, smoke particles and molecules of chemical compounds, has become known in other arrangements, this filter being equipped with a passive plate precipitator, a corona electrode, a blower and a mechanical coarse filter. In a filter of this type, two interconnected L-shaped section parts from dielectric workpiece are provided, whose legs are rigidly connected in pairs at their free edges by welding, bonding or riveting or such like, the L-shaped section parts being both assembled to form a frame constituting a box open at two diametrically opposite sides, which is enclosable into the apparatus housing, similar to a drawer. The frame is equipped with slots, recesses, bores, etc., in order to increase the electrical leakage paths. The filter plates, which are of different length and charged positively and negatively supported by the frames and their detachable attachment, are provided by continuously stamped retaining springs which hold themselves in grooves, wherein removal of bare ionization frames is provided which carry the ionization wires and the retaining springs stressing the same (DE-OS No. 2 341 626).

The construction of such an electrostatic filter is very expensive, since a plurality of aggregates and arrangements, which can be plugged together, has to be housed in the plastic housing. The air to be purified is conveyed through the filter by means of a blower.

SUMMARY OF THE INVENTION

Contrary to that, an object of the present invention task is to provide a novel electrode arrangement for use in apparatus for purification of air and other gases and/or for air conditioning, which gives rise to intensive corona discharges because of its electrode design and which is additionally suitable for installation in pipelines and fire places.

The above object is achieved in a simple manner with an electrostatic filter having a circular annular electrode connected to one pole of a high voltage DC supply from which circular electrode project corona discharge electrodes, and a field electrode connected to the other pole of the DC source, which is arranged within the region affected by the corona discharge electrodes. By means of the circular annular electrode and the field electrode arranged concentrically to and spaced therefrom along center line of said circular electrode, the optimum electric field can be produced for each utilization case depending on the spacing and the applied voltage. The corona discharge electrodes, designed according to the invention take care of the circumstance that between them and the field electrodes particularly high field strengths are produced. Because of this design, the electrode arrangement is not only able to liberate sufficient electrons, for generation of negatively charged gas ions which deposit themselves on the dust particles but also it is possible with this electrode arrangement to ionize gaseous harmful materials, gases as well as aerosols, and to cause them to precipitate at the field electrode, all this in an exactly intended manner.

Above all, in order to be able to optimally develop the field causing the corona dishcarge, the field electrode comprises a bead-shaped edge, which is spaced opposite from the free ends of the corona discharge electrodes.

In one embodiment example, the corona discharge electrodes are arranged axially in one direction on the circular annular electrode. In another embodiment example, an arrangement in which the corona discharge electrodes are arranged radially inward from the circular annular electrode, is advantageously utilized.

The electrode arrangement can be used in the smallest space. When using the electrode arrangement, one can vary the voltage, the electrode distances and the diameter of the annular electrode and the field electrode. In some circumstances, it can be sufficient with correct dimensioning to provide one electrode arrangement for a normal living room.

The basic design of the electrode arrangement is eminently suited for assembly of several basic elements. Herein several annular electrodes and field electrodes in tandem are attached on one insulation support each and, by mutual conducting connections, are respectively imparted with the same voltage. This basic concept, and also the multiple arrangement combined in such a way, is ideally suited to be utilized in pipelines. Several pipelines parallel to each other can be utilized in case of necessity.

If the field electrodes are designed as hollow cylinders with perforations it is possible to separate, in a simple manner, gases or gaseous harmful materials from a gas flow in a concerted manner. The gas ions deposited at the field electrodes are aspirated via an evacuation arrangement into the inside of the electrodes and from there they are, for instance, aspirated by a catalyzer.

The corona discharge electrodes can have any desired known shaping depending upon the individual case. In a preferred embodiment example, these electrodes are designed as ionization needles.

BRIEF DESCRIPTION OF THE DRAWINGS

With the above and additional objects and advantages in mind, as will herein appear, the invention will be described with reference to the accompanying drawings, in which:

FIG. 4 shows two embodiment examples with radially arranged corona discharge electrodes;

FIG. 5 shows two additional embodiment examples with radially arranged corona discharge electrodes;

FIG. 6 shows a cross-section along the line VI—VI through the arrangement according to FIG. 7.

DESCRIPTION OF THE PREFERRED EMBODIMENTS

Figure 1:
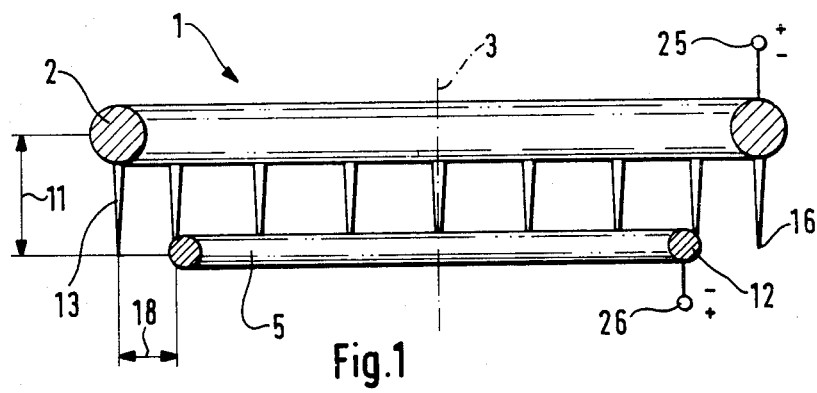
FIG. 1 shows a first embodiment example in cross-section.

FIG. 1 shows an electrode arrangement according to the invention in cross-section. An annular electrode 2 depicted in cross-section is connected to a pole 25 of a high DC source (not shown), which electrode is designed to be rotationally symmetrical around a center line 3. The annular electrode 2 can be made as a solid metal ring, for instance, from copper, and also as a solid plastics ring with a metallic coating.

From the annular electrode 2 of the electrode arrangement 1, corona discharge electrodes 13 project in the same direction in parallel with the center line 3. While the free ends 16 of the corona discharge electrodes 13 are constructed as spikes in the illustrated embodiment example, the corona discharge electrodes 13 can assume any desired shape. They can exhibit, for example, spherical heads or differently shaped head regions. In FIG. 1 they are designed as ionization needles.

At the other pole 26 of the high DC source a field electrode 5, constructed as an annulus, is connected. The field electrode 5 lies within the region 17 affected by the corona discharge electrodes 13.

The annular electrode 2 and the field electrode 5 are arranged at a spacing 11 from each other as well as concentrically to the common center line 3. Means can be provided in a practical version of an electrode arrangement according to the invention, permitting the varying of the spacing 11 between the annular electrode 2 and the field electrode 5. These variation possibilities apply, in principle, also for the embodiment examples of the invention explained in the following.

It is essential that the field electrode 5 as well as all other field electrodes in the invention exhibit bead-shaped edges 12.

It is recognizable without difficulties that a field is built up between the annular electrode 2 and the field electrode 5 because of the DC voltage applied between the poles 25 and 26. The corona discharge electrodes 13, at the potential of the annular electrodes 2, act as corona electrodes and develop considerable field strengths around their spike ends 16, which cause the corona discharges to happen. Because of these corona discharges in connection with the electrical field existing between the annular electrode 2 and the field electrode 5, charged dust particles and also aerosols or gases, migrate toward the field electrode 5 and deposit themselves thereon.

In special cases, which can be set up by the spacing 11 but also by the spacing 18 between the bead-shaped edge 12 and the free ends 16 of the corona discharge electrodes gas ions can also be produced, which migrate toward the field electrode 5 and deposit themselves there. A possibility for evacuating these gas ions from the field electrode 5 is explained further below.

Figure 2:
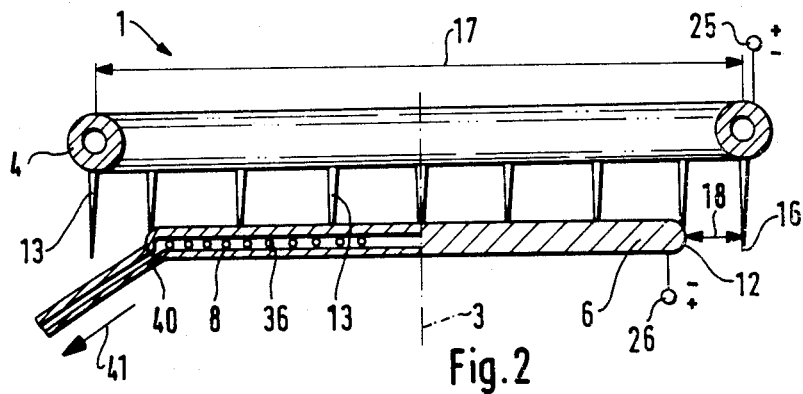
FIG. 2 shows two design alterations of the electrodes.

In FIG. 2, it is shown that the bead-shaped edge 12 of the field electrode 5 is located at the spacing 18 opposite the free ends 16 of the corona discharge electrodes. It is also clearly shown that the field electrode 5 is arranged within the region 17 affected by the corona discharge electrodes 13.

FIG. 2 shows an annular electrode 4 designed as a tube at which the corona discharge electrodes 13 are arranged.

A field electrode 6 constructed as a circular plate is recognizable on the right-hand side, of the FIG. 2, while on the left-hand side, a field electrode constructed as a flat circular can 8 is depicted. The wall of this can 8 exhibits apertures 36. In addition the can 8 is connected to an evacuation apparatus (not shown) by a suction tube 40, which generates a vacuum in direction of the arrow 41. This makes it possible to aspirate away gas ions which have arranged themselves at and have been precipitated on the surface of the can-shaped field electrode 8.

Figure 3:
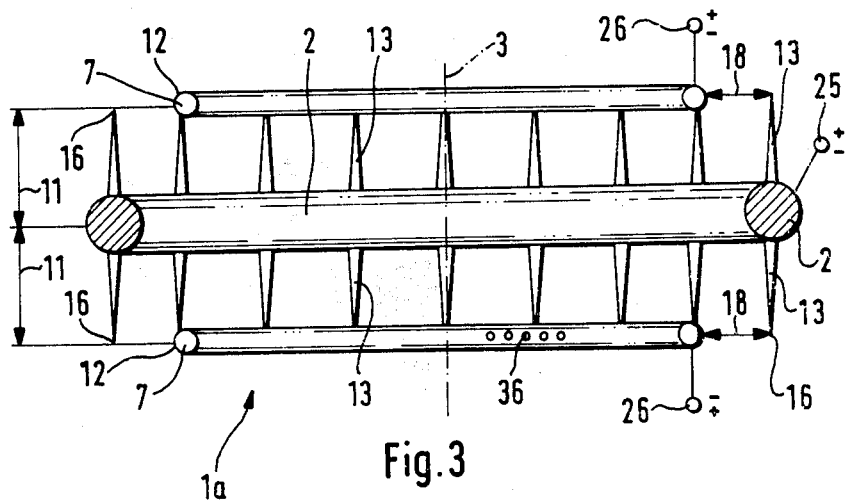
FIG. 3 shows another embodiment example of the invention.

FIG. 3 shows an embodiment example of an electrode arrangement, in which the corona discharge electrodes 13 are not only extend in the same direction parallel to the center line 3 coaxial with both the annular electrode 2 and the field electrode 5, but rather, extend on both sides of the annular electrode 2. In the embodiment example illustrated in FIG. 3, two field electrodes 7 are designed as tubes. The tube electrodes 7, on their part, can be provided with apertures 36 or with perforations and, in addition, can be connected through a suction opening (not shown) to an evacuation apparatus.

In the embodiment example according to FIG. 3, the field electrodes 7 lie opposite the respective free ends 16 of the corona discharge electrodes 13. With this electrode arrangement 1a according to FIG. 3, one can attain a considerably higher efficiency than with an electrode arrangement according to FIG. 1. The electrode arrangement 1 according to FIG. 1 as well as 1a according to FIG. 3 impose a very small interference resistance to a gas flow.

In the embodiment examples of the electrode arrangement 1b, according to FIG. 4, and 1c according to FIG. 5, the corona discharge electrodes 14 are arranged radially.

In an electrode arrangement 1b, according to FIG. 4 (on the left-hand side), the annular electrode 2 is arranged externally and the field electrode 5 constructed as an annulus is arranged on the inside. The corona discharge electrodes 14 extend radially inwards toward the bead-shaped edge 12 of the field electrode 5. The area 17 determined by the inner free ends 16 of the corona discharge electrodes 14 is not completely filled by the field electrode 5. Between the free ends 16 of the corona discharge electrodes 14 and the field electrode 5, a spacing 18 is provided. The spacing between the field electrode 5 and the annular electrode 12 is designated as 11.

A possible type of attachment of the electrode arrangement is also illustrated in FIG. 4. The annular electrode 2 is fastened at a wall or a stand 24 by means of a mounting 19. In this case either the wall or the stand 24 or the mounting 19 in an insulator.

The annular-shaped electrode 5 is fastened to the wall or the stand 24 by means of a concentric mounting 20. This concentric mounting 20 consists of spokes 22 which extend radially inward from the annular-shaped electrode 5 and are attached to an angular hook 23 on the inner side, by means of which also the concentric arrangement of the annular-shaped field electrode 5 within the annular electrode 2 is assured. According to FIG. 4 (on the right-hand side) the field electrode can also be constructed as a rod 5a.

In the embodiment example of an electrode arrangement 1c according to FIG. 5, the annular electrode 2 with the corona discharge electrodes 14 pointing extending radially outwards lies within a circular field electrode 9 or 10 designed as a cylinder jacket or a cylinder. The cylinder jacket electrode 9, depicted on the right-hand side in cross-section, consists of solid material or of a plastics ring which is coated with metal.

On the left-hand side of the FIG. 5, a field electrode 10 constructed as a hollow cylinder jacket is depicted. Apertures or perforations can be provided in the jacket of the field electrode 10 as well as an evacuation- or suction tube 40 (not shown), so that the gas ions precipitated on the field electrode 10 can be aspirated away.

In the embodiment example 1c, the also a spacing 18 between the free end 16 of the corona discharge electrodes 14 and the inner jacket of the field electrode 10 is shown and spacing 11 between the two electrodes 2 and 9 or 10 is also shown.

In the preferred embodiment examples, the annular electrodes 2, 4 as well as the field electrodes 5 to 10 are attached detachably at their mountings 19 and 20.

A further embodiment example of an electrode arrangement 1d is described in the following with the help of the FIGS. 6 and 7. Herein several annular electrodes 2, 4 and field electrodes 5 to 8 are successively fastened on respective insulating mountings and identical voltages are applied through mutual conducting connections.

Figure 7:
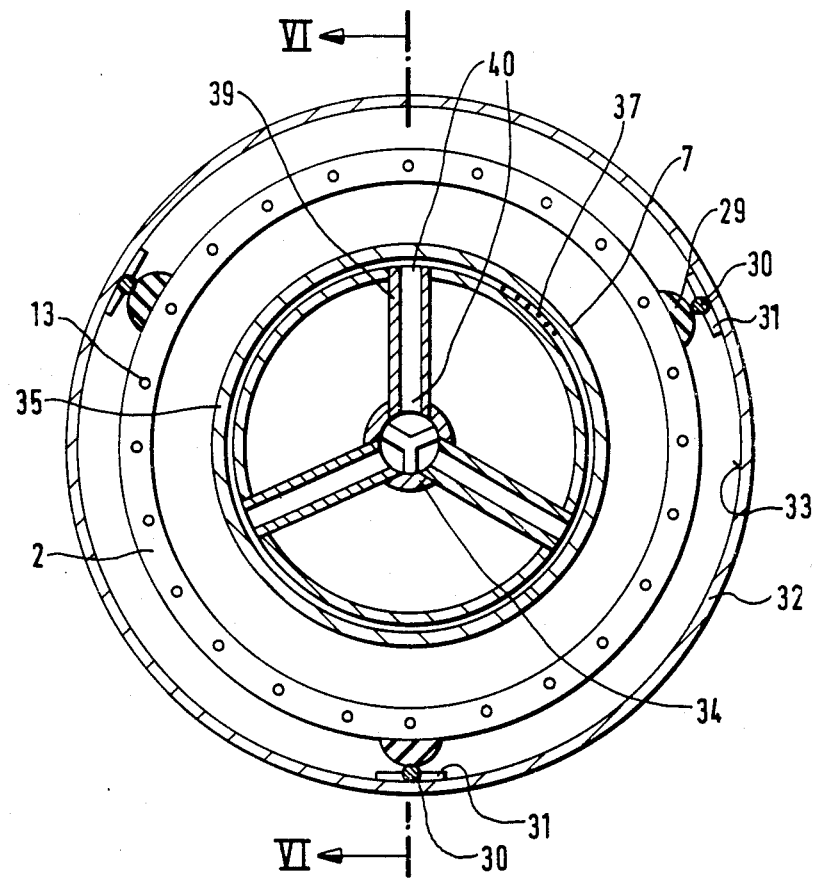
FIG. 7 shows a cross-section through the arrangement according to FIG. 6 along the line VII—VII.

FIG. 7 shows several annular electrodes 2 or 4, aligned in the same direction as the center line 3, are connected with braces 30 by means of insulators 29. These braces 30 are spaced form each other at angles of 120° in the embodiment example shown. The braces can be displaced in rails 31 in direction of the central line 3, which rails are fastened at the inner side 33 of a tube 32. All of the annular electrodes 2 and 4 connected with the braces 30 by means of the insulators 29 are connected with a pole 25 of a high voltage DC source by means of a connecting line 27.

It can be easily recognized that all the annular electrodes mutually connected by the braces can be pulled out of the tube 32 and can again be slid back into the tube 32.

The field annular electrodes 7, constructed as tubes which are provided with perforations, are in connection with a support tube 34 by means of hollow spokes 39. This support tube 34 is displaceable upon a carrier 35 in direction of the center line 3. The carrier 35 is shown with a star-shaped cross-section in the depicted embodiment example. The hollow spokes 39, are on the one hand, connected at the field annular electrode 7, constructed as a tube, by means of a suction aperture 40 and, on the other hand, also by means of a suction aperture 40 to the support tube 34, which, on its part, is connectable to an evacuation apparatus (not shown) as can be discerned from FIGS. 6 and 7. A suction direction according to arrow 41 is achieved by means of this evacuation apparatus, so that—as already described—gases precipitated on the surface of the field electrodes 7 can be aspirated away. The field annular electrodes 7 are connected at the pole 26 of the high voltage DC source by means of a conducting line 28.

In all embodiment examples according to the invention, the corona discharge electrodes 13, 14 and the field electrodes 5, 5a, 6, 7, 8, 9, 10 or their surfaces consist of a noncorrosive material.

Because of the special preferably annular-shaped or cylindrically or rod-shaped construction of the electrodes there results an extremely small flow resistance in all application cases.

I claim:

1. Electrode arrangement for corona discharges, preferably for use in apparatus for purification of air and other gases and/or for air-conditioning, characterized in that said electrode arrangement comprises a circular annulus electrode connected to one pole of a high voltage DC source, said circular annulus electrode having corona discharge electrodes extending therefrom, and a circular ring-shaped field electrode connected to another pole of said DC source, said field electrode being arranged concentrically with said circular annulus electrode and said corona discharge electrodes so that corona discharge field lines are formed symmetrically to radial lines extending from respective free ends of said corona discharge electrodes to a center line of said field electrode.

2. Electrode arrangement according to claim 1, characterized in that the circular annular electrode and the field electrode are spaced apart from each other along said center line.

3. Electrode arrangement according to claim 1 or 2, characterized in that the field electrode has a bead-shaped edge.

4. Electrode arrangement according to claim 3, characterized in that the bead-shaped edge of the field electrode lies opposite the free ends of the corona discharge electrodes at a predetermined spacing.

5. Electrode arrangement according to claim 1, characterized in that the corona discharge electrodes extend unidirectionally from the circular annulus electrode parallel to a center line of the circular annulus electrode and the center line of the field electrode.

6. Electrode arrangement according to claim 1, characterized in that the corona discharge electrodes extend on opposite sides of the circular annulus electrode parallel to a center line thereof.

7. Electrode arrangement according to claim 1, characterized in that the corona discharge electrodes extend radially from the circular annulus electrode.

8. Electrode arrangement according to claim 7, characterized in that the corona discharge electrodes extend inwardly.

9. Electrode arrangement according to claim 1 characterized in that the field electrode formed as a circular annulus.

10. Electrode arrangement according to claim 1 characterized in that the field electrode formed as a circular plate.

11. Electrode arrangement according to claim 7, characterized in that the corona discharge electrodes extend outwardly and the field electrode, formed as a cylinder jacket, is arranged, at a predetermined spacing from the free ends of the corona discharge electrodes, around said corona discharge electrodes.

12. Electrode arrangement according to claim 1, characterized in that the circular annulus electrode is fastened by means of a mounting to a stand or wall.

13. Electrode arrangement according to claim 12, characterized in that the field electrode is fastened by means of a concentric mounting to said stand or wall.

14. Electrode arrangement according to claim 13, characterized in that the circular annulus electrode and the field electrode are connected detachably with the respective mountings.

15. Electrode arrangement according to claim 14, characterized in that the mountings are insulated mountings.

16. Electrode arrangement according to claim 1 or 5, characterized in that said electrode arrangement comprises a plurality of circular annulus electrodes and a respective plurality of field electrodes successively fastened on respective insulated mountings, said circular annulus electrodes and said field electrodes being respectively connected to said poles of said DC source by means of respective conducting connecting lines.

17. Electrode arrangement according to claim 16, characterized in that the insulated mounting for said plurality of circular annulus electrodes includes braces connected by insulators with said circular annulus electrodes and aligned unidirectionally with a center line thereof, and rails along which the braces are displaceable along the center line.

18. Electrode arrangement according to claim 17, characterized in that the rails are located at an inner side of a tube.

19. Electrode arrangement according to the claim 16, characterized in that said plurality of field are fastened successively on a support tube by means of the insulated mounting, said support tube resting on a carrier and being displaceable thereon along the center line.

20. Electrode arrangement according to claim 19, characterized in that the carrier has a star-shaped cross-section.

21. Electrode arrangement according to claim 1, characterized in that the circular annulus electrode is constructed as a tube.

22. Electrode arrangement according to claim 1, characterized in that the field electrode is designed as a tube.

23. Electrode arrangement according to the claim 1 characterized in that the corona discharge electrodes are designed as ionization needles.

24. Electrode arrangement according to claim 1, characterized in that the field electrode is designed as a flat hollow can.

25. Electrode arrangement according to claim 1, characterized in that the field electrode is designed as a hollow cylinder.

26. Electrode arrangement according to the claim 22, 24 or 25, characterized in that the field electrode has apertures formed therein and a suction nozzle for connecting the field electrode to an evacuation arrangement.

27. An electrode arrangement according to claim 26, characterized in that said electrode arrangement comprises a plurality of circular annulus electrodes and a respective plurality of field electrodes successively fastened on respective insulated mountings, said circular annulus electrodes and said field electrodes being connected to said poles said DC source by means of respective conducting connecting lines, wherein said insulated mounting for said field electrodes includes hollow spokes connecting said field electrodes to a central support tube, said hollow spokes forming said suction nozzle for each of said field electrodes and said support tube being connected to said evacuation arrangement.

* * * * *